US012415237B2

United States Patent
Bog et al.

(10) Patent No.: US 12,415,237 B2
(45) Date of Patent: Sep. 16, 2025

(54) WELD BEAD INSPECTION DEVICE (71) Applicant: AGRU KOREA CO., LTD., Gwangju-si (KR)

(72) Inventors: Min-gab Bog, Daejeon (KR); Hyeon Seop Park, Daejeon (KR); Na Yeong Park, Daejeon (KR); Kyoung Hwan Heo, Daejeon (KR)

(73) Assignee: AGRU KOREA CO., LTD., Gwangju-si (KR)

( * ) Notice: Subject to any disclaimer, the term of this patent is extended or adjusted under 35 U.S.C. 154(b) by 332 days.

(21) Appl. No.: 17/996,605

(22) PCT Filed: Apr. 20, 2021

(86) PCT No.: PCT/KR2021/004962
§ 371 (c)(1),
(2) Date: Oct. 19, 2022

(87) PCT Pub. No.: WO2021/215802
PCT Pub. Date: Oct. 28, 2021

(65) Prior Publication Data
US 2023/0137583 A1 May 4, 2023

(30) Foreign Application Priority Data

Apr. 20, 2020 (KR) .......... 10-2020-0047746
Feb. 15, 2021 (KR) .......... 10-2021-0020188

(51) Int. Cl.
*B23K 31/12* (2006.01)
*G06T 7/00* (2017.01)
*G06V 10/141* (2022.01)

(52) U.S. Cl.
CPC .......... *B23K 31/125* (2013.01); *G06T 7/0004* (2013.01); *G06V 10/141* (2022.01);
(Continued)

(58) Field of Classification Search
CPC ................ B23K 31/125; G06T 7/0004; G06T 2207/30136; G06T 2207/30152; G06V 10/141
See application file for complete search history.

(56) References Cited

U.S. PATENT DOCUMENTS 4,734,766 A * 3/1988 Shiozumi ............. G01B 11/024
382/141
10,906,080 B2 * 2/2021 Bishop ................. B21D 26/033
(Continued)

FOREIGN PATENT DOCUMENTS

CN 104748698 A * 7/2015
EP 1718957 B1 * 5/2007 ........... G01N 21/952

*Primary Examiner* — Michael Robert Cammarata (57) ABSTRACT

The present invention relates to a weld bead inspection device that inspects the shape of a weld bead, and provides a weld bead inspection device capable of inspecting the welding quality, welding state, and the like by imaging the shape of the weld bead in a pipe. For this purpose, the weld bead inspection device of the present invention includes an image sensor unit that images a shape of a weld bead in a downwardly open inner space formed on a middle inner side of a housing unit and an illumination unit that provides illumination light directly or indirectly to the weld bead. Accordingly, by moving and rotating the weld bead inspection device along an outer peripheral surface of a pipe to be inspected, it is possible to quickly and accurately inspect the weld bead by virtue of a simple inspection operation even in a complex facility structure.

11 Claims, 10 Drawing Sheets

(52) U.S. Cl.
CPC .............. *G06T 2207/30136* (2013.01); *G06T 2207/30152* (2013.01)

(56) References Cited

U.S. PATENT DOCUMENTS

| | | | |
|---|---|---|---|
| 2011/0198316 A1* | 8/2011 | Legori | B23K 37/0531 |
| | | | 219/61.1 |
| 2016/0003751 A1* | 1/2016 | Reiz | B29C 65/8253 |
| | | | 356/237.2 |
| 2017/0276260 A1* | 9/2017 | Bonel | F16L 13/02 |
| 2023/0035418 A1* | 2/2023 | Choi | G01N 21/952 |
| 2023/0226646 A1* | 7/2023 | Bog | B23K 31/125 |
| | | | 228/104 |

* cited by examiner

WELD BEAD INSPECTION DEVICE

CROSS REFERENCE TO RELATED APPLICATIONS

The present application is a National Phase of International Application No. PCT/KR2021/004962 filed on Apr. 20, 2021, which claims the priority based on Korean Patent Application No. 10-2020-0047746 filed on Apr. 20, 2020 and Korean Patent Application No. 10-2021-0020188 filed on Feb. 15, 2021, and the entire contents disclosed in the description and drawings of the corresponding applications are referenced in the present application.

TECHNICAL FIELD

The present invention relates to a weld bead inspection device that inspects the shape of a weld bead, and particularly to a weld bead inspection device that inspects the welding quality, welding state, and the like by imaging the shape of a bead generated during a welding process of a pipe.

BACKGROUND OF THE INVENTION

In general, the methods of inspecting welding quality, welding state, and the like are largely divided into destructive inspection and non-destructive inspection. The non-destructive inspection of these inspections is a method of inspecting a workpiece without changing the product integrity or surface state. Representatively, a liquid penetration method, a magnetic flaw detection method, an ultrasonic inspection method, an acoustic radiation method, a radiographic method, an eddy current method, a thermal flaw detection method, a holographic technique, and the like are used to observe surface defects or internal defects of materials. The non-destructive inspection is mainly used to inspect, evaluate, troubleshoot, and study expensive parts such as aircraft parts while saving time and money because of the property that a material can be inspected without being destructed.

For example, in the case of a plastic pipe, welding of a fusion bonding (or welding bonding) method in which individual pipe members are melted at end portions thereof and joined to each other is frequently used, and after the welding operation, whether or not the joined pipe member is accurately welded is inspected. In this case, since high-accuracy welding is not required for the above member, when the welding state is inspected, an operator visually inspects whether or not an abnormality has occurred in the shape or length of a bead formed due to the melting to determine whether or not there is a defect. However, since visually inspecting the welding state in this way not only may take a lot of time but also may be affected by human factors such as the skill and psychological situation of an inspector, there is a problem in terms of the reliability of inspection results.

For this purpose, a non-destructive inspection device for inspecting a welded portion has been developed. For example, as shown in a number of precedent literatures including Korean Patent Registration No. 10-1293574 and Korean Patent Registration No. 10-0532637, non-destructive inspection devices using ultrasound are mainly used.

However, such non-destructive inspection devices using ultrasound are not only too expensive, but also have a problem in that it is inappropriate to proceed with an inspection in a complex piping facility because the unit inspection time is long.

DETAILED DESCRIPTION OF THE INVENTION

Technical Challenges

Accordingly, the present invention is to improve the conventional problems as described above and to provide an inspection device that provides a structure in which an operator can easily fix the inspection device on a pipe to be inspected and perform an inspection process intuitively, thereby improving ease of use and significantly reducing the operation time.

In addition, the present invention is to provide an inspection device capable of securing the protection and long lifespan of an inspection target by being configured to include a detailed structure so as to prevent a bead from being damaged due to the application of an impact to the bead or occurrence of interference in the bead by a fixing means of the device.

In addition, the present invention is to provide an inspection device with increased convenience in using the device by being configured to include a structure that changes the size of the fixing means so that the fixing means can be easily adjusted to cope with various diameters of the pipe to be inspected.

The technical challenges to be achieved by the present invention are not limited to the technical challenges mentioned above, and other technical challenges not mentioned can be clearly understood by persons having ordinary skill in the art to which the present invention pertains from the following description.

Technical Solution

In order to achieve the above technical challenges, a weld bead inspection device according to an embodiment of the present invention is a device that inspects a shape of a weld bead on an outer surface of a pipe. The device includes an image sensor unit that images the shape of the weld bead in a downwardly open inner space formed on a middle inner side of a housing unit; and an illumination unit that provides illumination light directly or indirectly to the weld bead. The housing unit has a pipe mounting surface formed on a lower side of the housing unit so as to be mounted on the outer surface of the pipe and be slidable along the outer surface.

In addition, the weld bead inspection device according to the embodiment of the present invention may further include a background member at a position facing the image sensor unit. The illumination unit may provide the illumination light to the weld bead in the form of reflected light reflected from a front surface of the background member.

In addition, the weld bead inspection device according to the embodiment of the present invention may further include a background member at a position facing the image sensor unit. The illumination unit may provide the illumination light to the weld bead in the form of transmitted light transmitted from a back surface of the background member.

In addition, the weld bead inspection device according to the embodiment of the present invention may have a structure in which depending on a color of the outer surface of the pipe, a surface color of the background member is replaced or a color of the illumination light of the illumination unit is changed.

In addition, the weld bead inspection device according to the embodiment of the present invention may further include a fixing unit that maintains a pipe mounting state of the weld bead inspection device so that the inspection device is allowed to stably travel along an outer peripheral surface of the pipe. At least a part of the fixing unit may be formed of an elastic material or may be formed in a structure including an elastic element.

In addition, in the weld bead inspection device according to the embodiment of the present invention, the fixing unit may include a band member having a length capable of reaching the outer peripheral surface of the pipe while surrounding the outer peripheral surface at least from one side of the housing unit to the other side and formed of a flexible material; and a band fixing member that is provided on at least one of one side and the other side of the housing unit and releasably fixed to form a pipe mounting state of the weld bead inspection device.

In addition, in the weld bead inspection device according to the embodiment of the present invention, the fixing unit may include a length adjusting part on any one of one side and the other side of the housing unit to adjust a length of the band member to a length corresponding to an outer diameter dimension of the pipe.

In addition, in the weld bead inspection device according to the embodiment of the present invention, the fixing unit may further include a bead passing groove or a slip member in a longitudinal direction of the band member to prevent interference with the weld bead.

In addition, the weld bead inspection device according to the embodiment of the present invention may further include light shielding units, which reduce or shield light transmitted from the outside, at both end portions of a curved pipe mounting surface formed on a lower side of the housing unit.

Effects of the Invention

According to the solutions for the above challenges, the weld bead inspection device according to the present invention is configured such that the inspection device mounted on the pipe to be inspected is brought into close contact with the band and then easily fixed, and then the operator rotates the device by his/her hand. Accordingly, the effect of significantly reducing the operation time is exhibited.

In addition, by having the structure provided with the bead passing groove so as to prevent interference with the weld bead, the possibility of damage to the bead and the device is reduced, the inspection accuracy is improved, and the inspection convenience is provided.

In addition, by being configured to include the structure provided with a buckle so that the length of the band can be adjusted, the effect of significantly increasing the convenience in using the device is exhibited.

The effects of the present invention are not limited to the above effects, and it should be understood to include all effects that can be inferred from the configuration of the invention described in the detailed description or claims of the present invention.

BRIEF DESCRIPTION OF THE DRAWINGS

As a bead interference prevention structure of the fixing unit of the weld bead inspection device according to the embodiment of the present invention.

As an example of a band fixing member of the fixing unit in the weld bead inspection device according to the embodiment of the present invention.

As a friction reducing structure of the fixing unit of the weld bead inspection device according to the embodiment of the present invention.

BEST MODES FOR CARRYING OUT THE INVENTION

Hereinafter, the present invention will be described with reference to the accompanying drawings. However, the present invention may be embodied in several different forms, and thus is not limited to an embodiment described herein.

Throughout the specification, when a certain portion is "coupled (connected, contacted, or combined)" with another portion, this includes not only "directly coupled" but also "indirectly coupled" with another member interposed therebetween. In addition, when a certain portion "includes" a certain component, this means that other components may be further included, rather than excluding the other components, unless otherwise stated.

The terms used in the present invention are used only to describe a specific embodiment and are not intended to limit the present invention. Singular expressions include plural expressions unless the singular expressions clearly indicate otherwise in context. In the present specification, it is to be understood that terms such as "include" or "have" are intended to designate that features, numbers, steps, operations, components, parts, or combinations thereof described in the specification are present and the possibility of the presence or addition of one or more other features, numbers, steps, operations, components, parts, or combinations thereof is not excluded in advance.

Hereinafter, a preferred embodiment of the present invention will be described with reference to the accompanying drawings so that persons having ordinary knowledge in the art can easily implement the invention.

Figure 1:
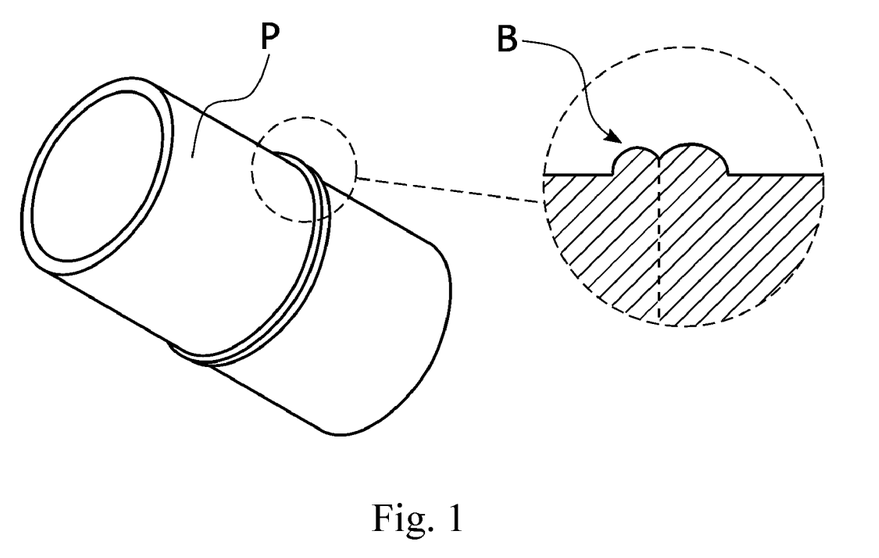
FIG. 1 shows a weld bead of a weld-joined pipe.
Figure 2:
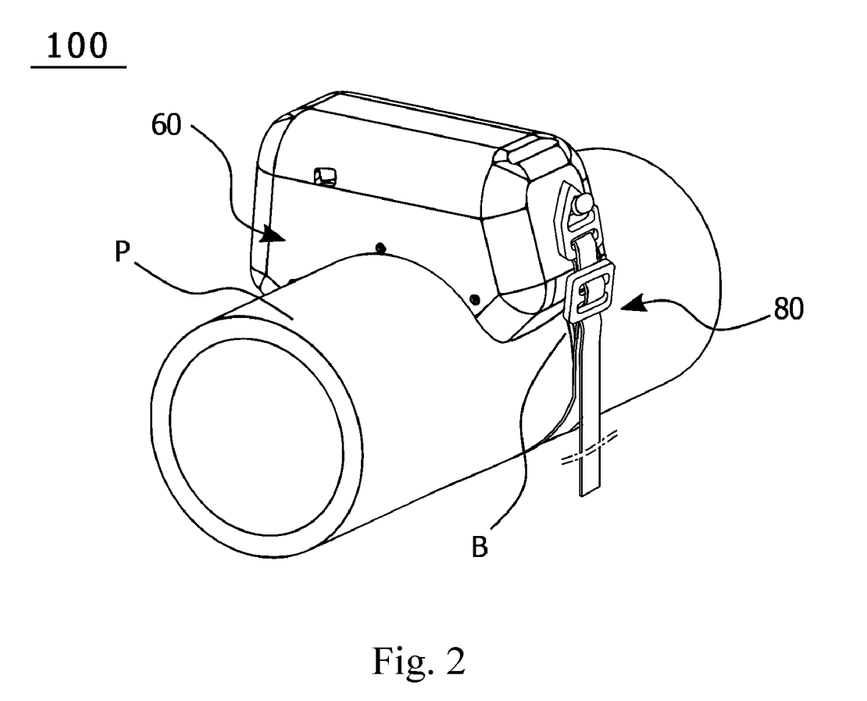
FIG. 2 is a perspective view of a weld bead inspection device according to an embodiment of the present invention.
Figure 3:
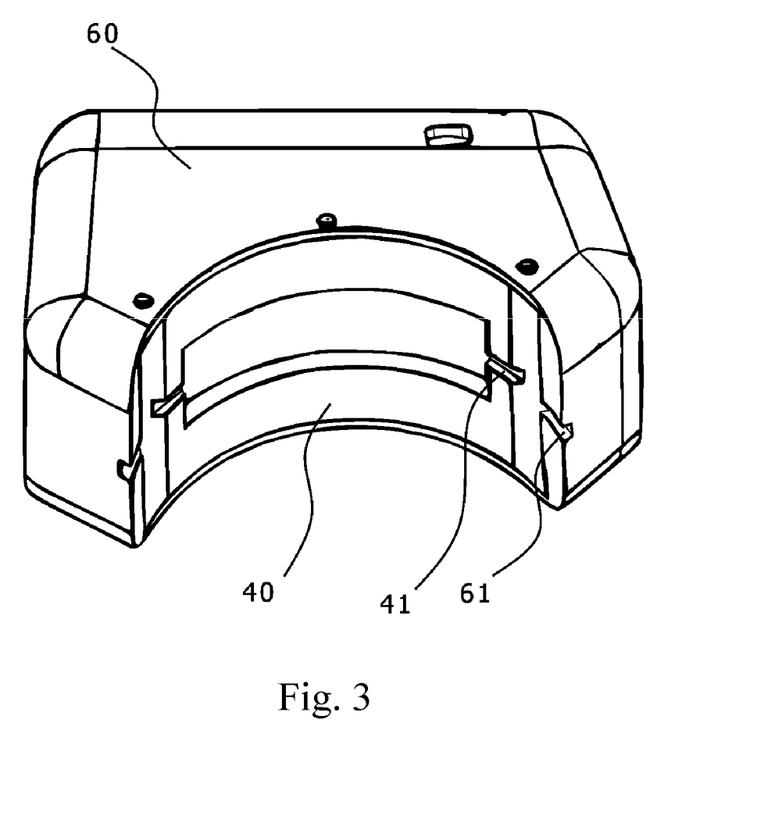
FIG. 3 is a bottom perspective view of a housing of the weld bead inspection device according to the embodiment of the present invention.

First, referring to the respective drawings, FIG. 1 exemplarily shows a weld bead of a weld-joined pipe and shows a representative shape of a weld bead B formed by melting between two pipes joined by a predetermined welding method. FIG. 2 is a perspective view of a weld bead inspection device according to the embodiment of the present invention and shows a state in which the weld bead inspection device is mounted and fixed on an outer surface of the pipe by a band member so that the shape of the weld bead can be imaged through an image sensor unit and can be inspected using the obtained image. FIG. 3 is a bottom perspective view of a housing of the weld bead inspection device according to the embodiment of the present invention and shows a contact member having a bead passing groove on a lower side thereof and the housing.

Figure 4A:
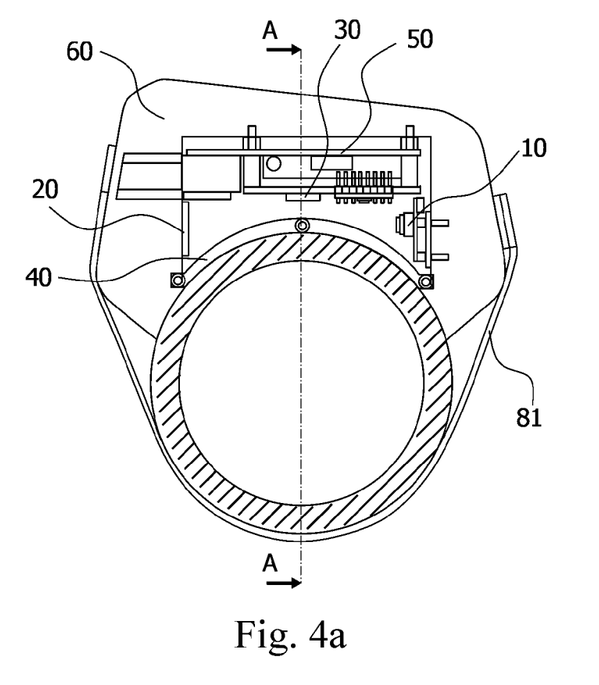
FIG. 4(a) shows a detailed structure in the weld bead inspection device according to the embodiment of the present invention.
Figure 4B:
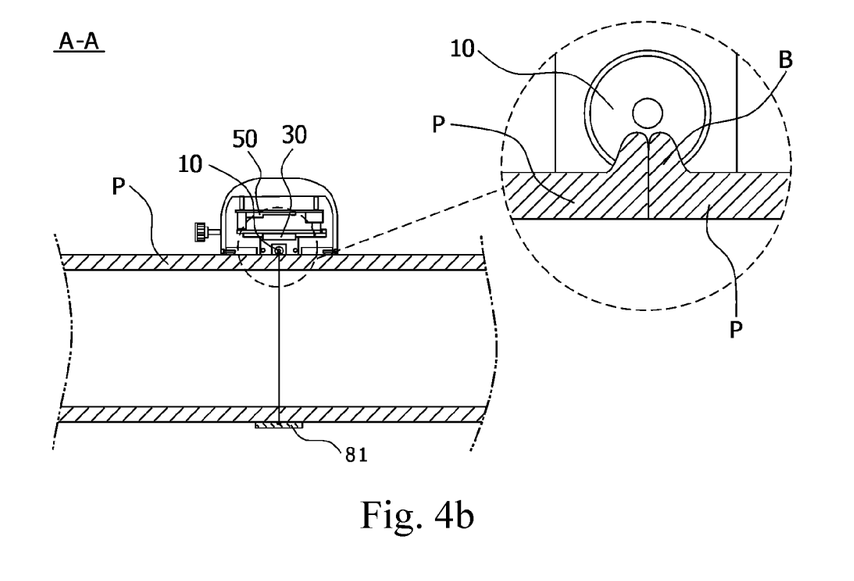
FIG. 4(b) is a cross-sectional view (A-A) of FIG. 4(a) and shows the overall layout structure of the image sensor unit that images the weld bead B and an enlarged part thereof.
Figure 5A:
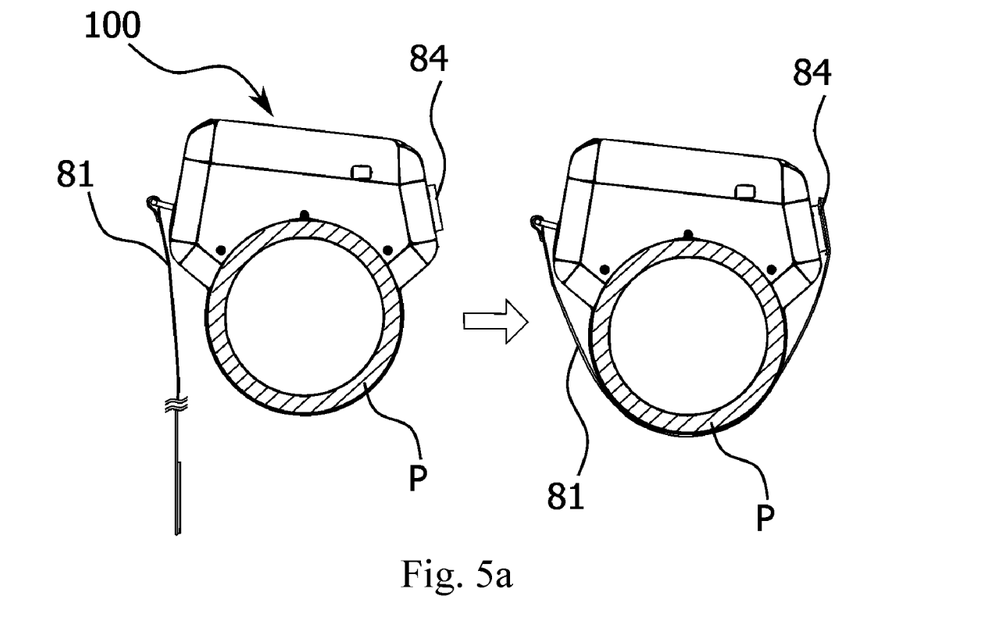
FIG. 5(a) shows a process of forming a bead inspection preparation state of the weld bead inspection device according to the embodiment of the present invention.
Figure 5B:
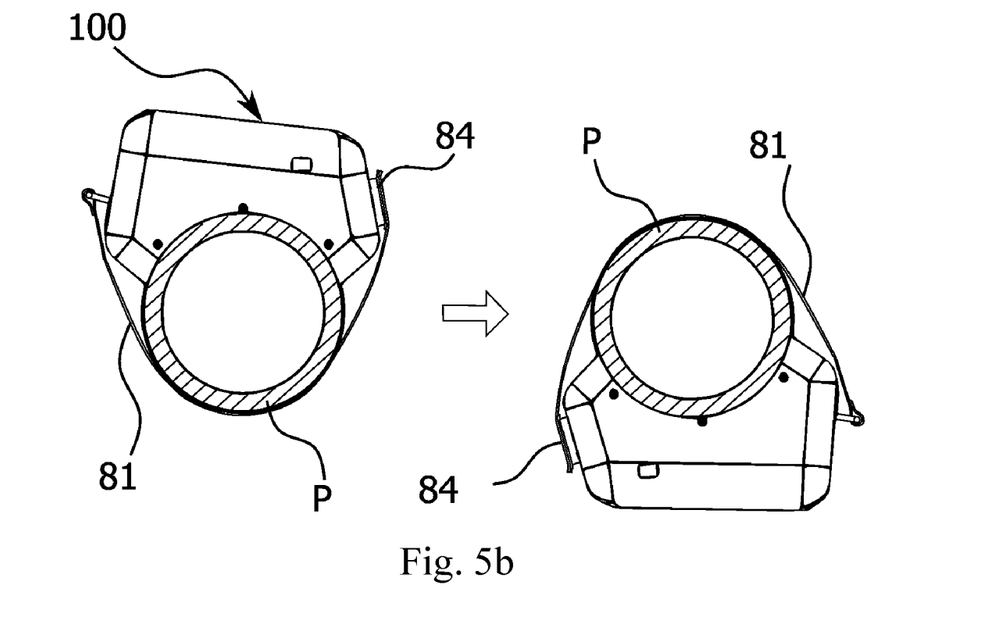
FIG. 5(b) shows a state in which the weld bead inspection device rotates around the pipe and the inspection is in progress.

FIG. 4 shows a detailed structure of the weld bead inspection device according to the embodiment of the present invention, (a) of FIG. 4 shows a detailed structure in the device, and (b) of FIG. 4 is a cross-sectional view (AA) of (a) of FIG. 4 and shows the overall layout structure of the image sensor unit that images the weld bead B and an enlarged part thereof. FIG. 5 is a use state view of the weld bead inspection device according to the embodiment of the present invention, (a) of FIG. 5 shows a process of forming a bead inspection preparation state of the weld bead inspection device, and (b) of FIG. 5 shows a state in which the weld bead inspection device rotates around the pipe and the inspection is in progress.

Figure 6:
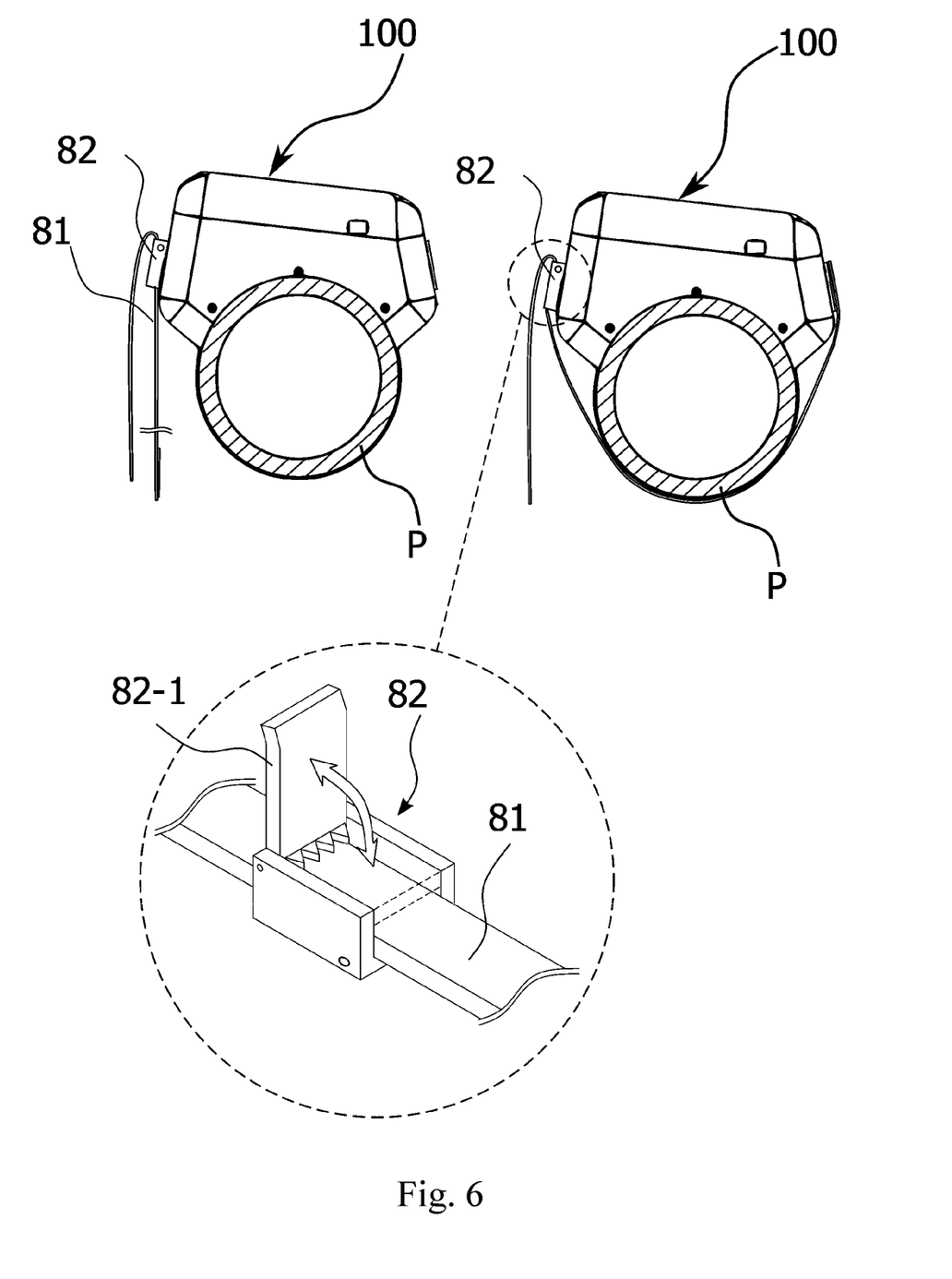
FIG. 6 shows a variable length setting structure of a fixing unit in the weld bead inspection device according to the embodiment of the present invention.
Figure 7:
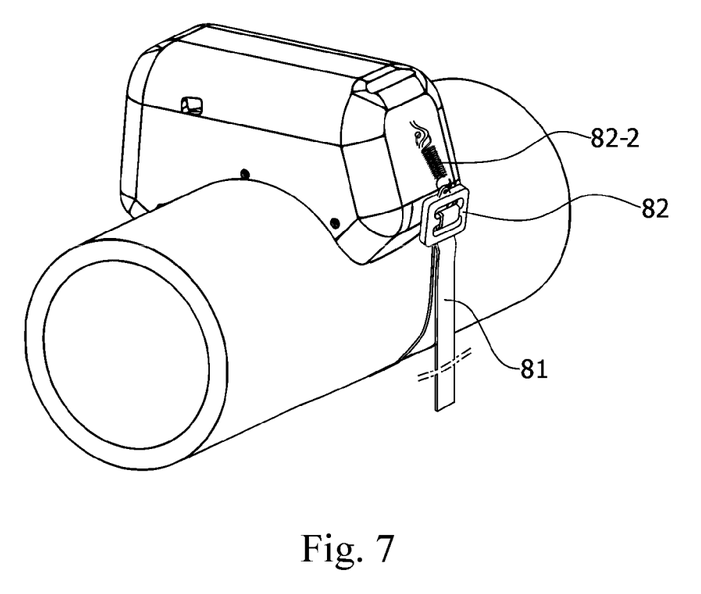
FIG. 7 shows a modification example of the variable length setting structure of the fixing unit in the weld bead inspection device according to the embodiment of the present invention.

FIG. 6 shows a variable length setting structure of the fixing unit in the weld bead inspection device according to the embodiment of the present invention and shows an exemplary structure that can cope with pipes of various diameters through a structure capable of variably fixing one end of the band member. FIG. 7 shows a modification example of the variable length setting structure of the fixing unit in the weld bead inspection device according to the embodiment of the present invention, and exemplarily shows a length adjusting structure of the band member through a buckle structure.

Figure 8A:
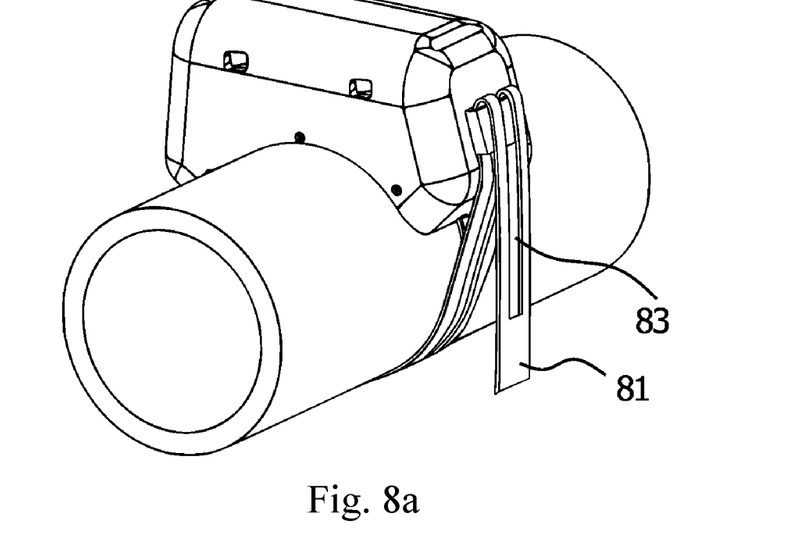
FIG. 8(a) shows the band member having the bead passing groove so that interference with the bead B is prevented.
Figure 8B:
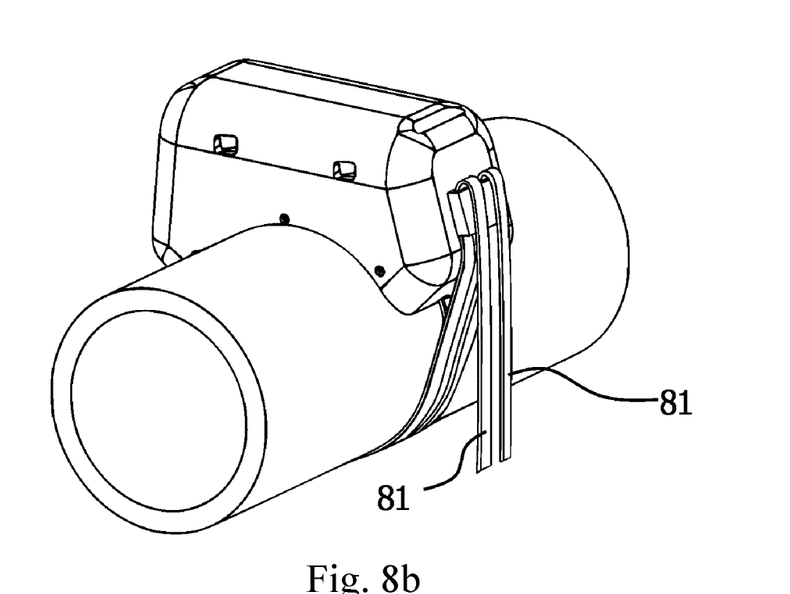
FIG. 8(b) shows that two band members provided to be spaced apart from each other to prevent the interference with the bead B are in close contact with the pipe P.
Figure 9A:
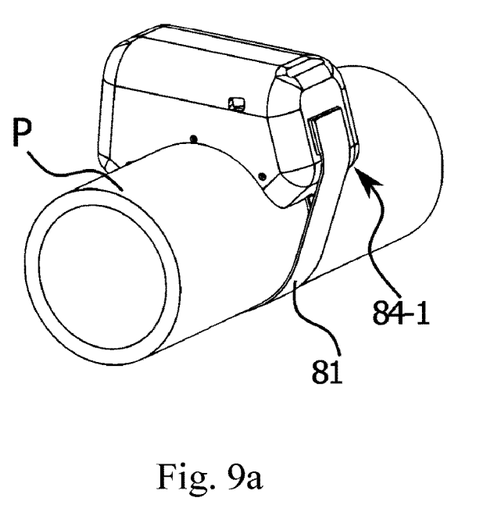
FIG. 9(a) shows a band fixing member having a Velcro structure adapted such that the band member is not released during weld bead inspection.
Figure 9B:
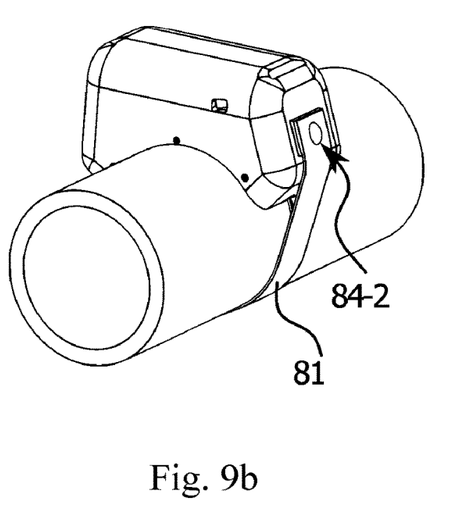
FIG. 9(b) shows a band fixing member having a tick-tock structure.
Figure 9C:
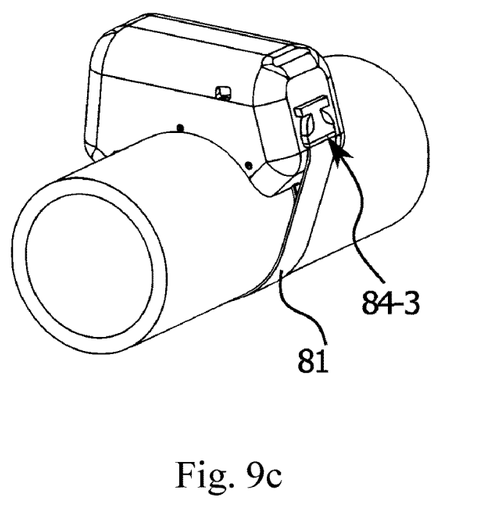
FIG. 9(c) shows a band fixing member having a buckle structure.
Figure 9D:
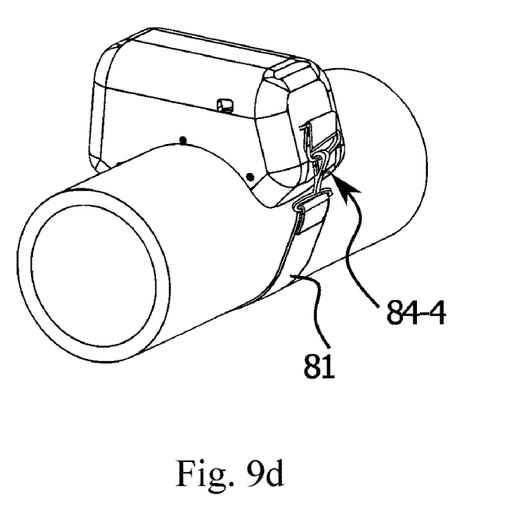
FIG. 9(d) shows a band fixing member having a hook structure.

FIG. 8 shows a bead interference prevention structure of the fixing unit of the weld bead inspection device according to the embodiment of the present invention, (a) of FIG. 8 shows the band member having the bead passing groove so that interference with the bead B is prevented, and (b) of FIG. 8 shows that two band members provided to be spaced apart from each other to prevent the interference with the bead B are in close contact with the pipe P. FIG. 9 shows various examples of a band fixing member of the fixing unit in the weld bead inspection device according to the embodiment of the present invention, (a) of FIG. 9 shows a band fixing member having a Velcro structure adapted such that the band member is not released during weld bead inspection, (b) of FIG. 9 shows a band fixing member having a tick-tock structure, (c) of FIG. 9 shows a band fixing member having a buckle structure, and (d) FIG. 9 shows a band fixing member having a hook structure.

Figure 10A:
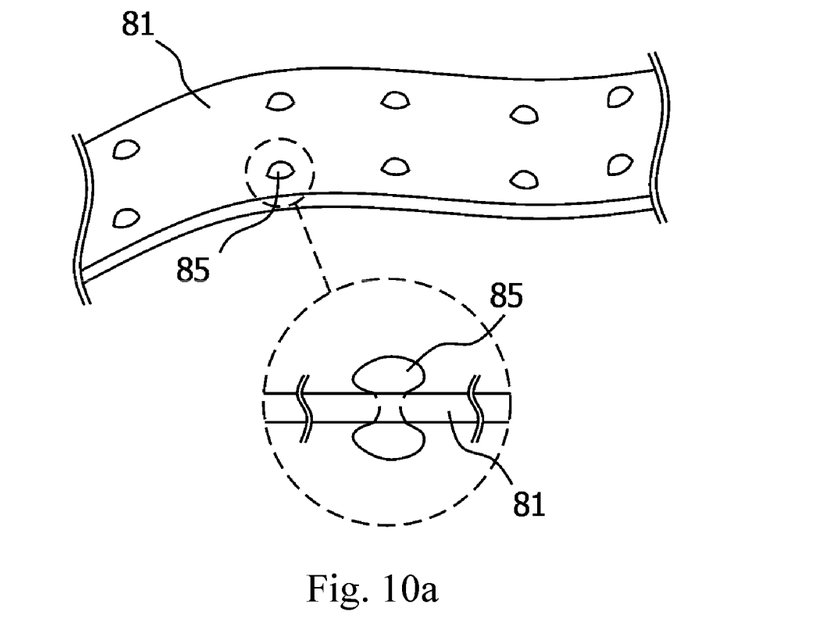
FIG. 10(a) shows a structure having a slip member on a contact surface of the band member so that friction between the band member and the pipe is reduced.
Figure 10B:
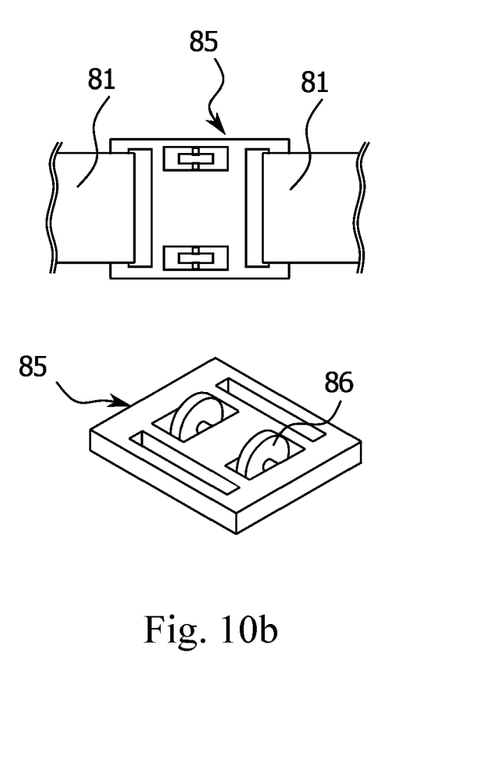
FIG. 10(b) shows a structure in which at least one slip member having a rolling wheel is provided in the middle of the band member.
Figure 10C:
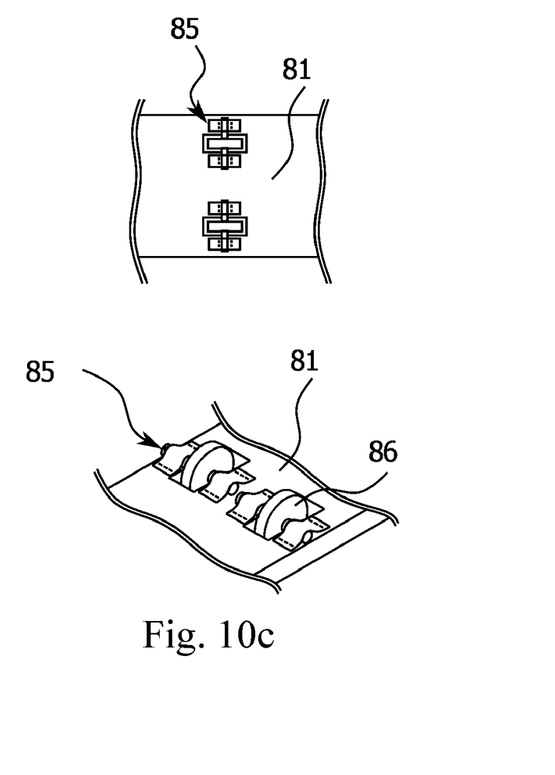
FIG. 10(c) shows a structure in which the slip member is formed by directly fixing the rolling wheel to the band member.

FIG. 10 shows a friction reducing structure of the fixing unit of the weld bead inspection device according to the embodiment of the present invention, (a) of FIG. 10 shows a structure having a slip member on a contact surface of the band member so that friction between the band member and the pipe is reduced, (b) of FIG. 10 shows a structure in which at least one slip member having a rolling wheel is provided in the middle of the band member, and (c) of FIG. 10 shows a structure in which the slip member is formed by directly fixing the rolling wheel to the band member.

Figure 11:
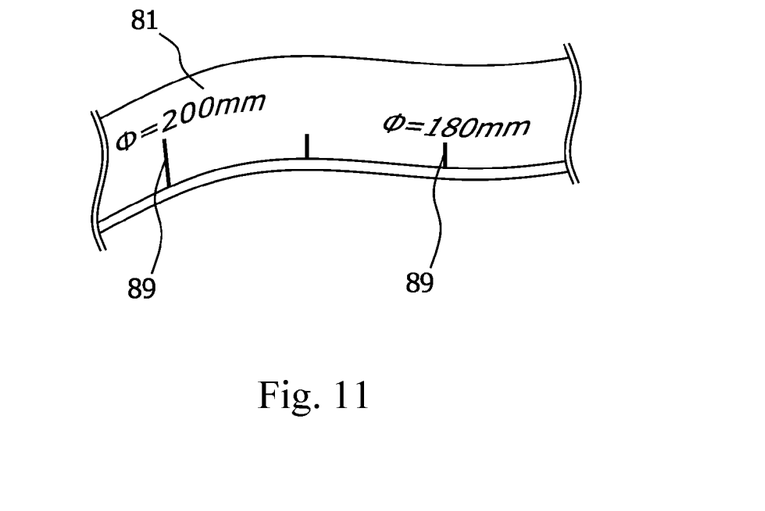
FIG. 11 shows a scale indicator of the fixing unit in the weld bead inspection device according to the embodiment of the present invention.
Figure 12:
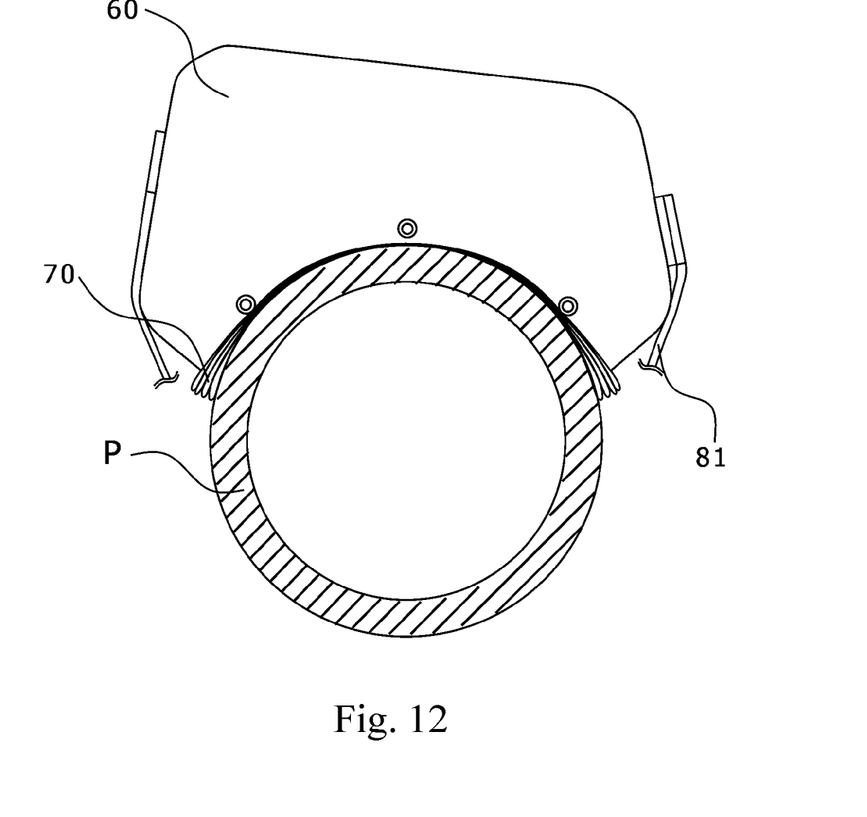
FIG. 12 shows a light-shielding complementary structure corresponding to various diameters of a pipe to be inspected in the weld bead inspection device according to the embodiment of the present invention.

FIG. 11 shows a scale indicator of the fixing unit of the weld bead inspection device according to the embodiment of the present invention, and exemplarily shows a structure in which the scale indicator is provided in a longitudinal direction of the band member to guide the length setting of the band member. FIG. 12 shows a light-shielding supplementary structure corresponding to various diameters of a pipe to be inspected in the weld bead inspection device according to the embodiment of the present invention and shows a structure in which the incidence of external light that hinders the measurement of a bead image is shielded by a light shielding unit of a telescopic or foldable structure.

As shown in FIG. 1, the weld bead inspection device according to the embodiment of the present invention is provided for inspecting a welded portion between two weld-joined pipes P, the bead B is formed in a case where the end portions of the pipes are melted and welded to each other, and the welding quality, the welding state, and the like can be estimated with relatively high accuracy from the external shape of such a bead B. It is preferable that the shape data of the weld bead B imaged by the image sensor unit 10 is stored in a storage medium provided in a control module unit 50 or is transmitted by wire or wirelessly to a computer, a mobile electronic device, or the like and is used by an operator. In the weld bead inspection device, in determining whether or not the bead is abnormal, in addition to a preset reference value, not only previously measured bead inspection data but also newly accumulated recent bead inspection data may be used.

As shown in FIGS. 2 to 12, the weld bead inspection device 100 according to the embodiment of the present invention is a device that inspects the welded portion of the pipe P, is mounted on the welded portion between the two pipes P to form the inspection preparation state, is rotated in a circumferential direction in a state in which the device is in close contact with the outer surface of the pipe P, and inspects the external shape of the weld bead B. As a detailed configuration of the device, the device may be configured to include the image sensor unit 10 that images the outer shape of the weld bead B; a background member 20 that provides a background so that the external shape of the bead can be easily detected when the external shape of the weld bead is imaged by the image sensor unit 10; an illumination unit 30 that provides a light source for imaging the external shape of the weld bead B; a housing unit 60 that shields an imaging space for the weld bead from external light as a main body capable of fixing the image sensor unit 10 and the background member 20, respectively; and the like. The background member 20 provides a background of the weld bead image in a case where the external shape of the weld bead is imaged by the image sensor unit 10 in a tangential direction of the pipe, and the illumination unit 30 is capable of providing illumination light to the weld bead in the form of reflected light reflected from a front surface of the background member 20 or providing the illumination light to the weld bead in the form of transmitted light (or in the form of backlight) transmitted from a back surface of the background member 20.

In the weld bead inspection device 100 according to the embodiment of the present invention, it is preferable that the housing unit 60 forming the appearance of the device forms, in a middle inner space thereof, a structure in which the image sensor unit 10, the background member 20, and the illumination unit 30 can be disposed, and as shown in FIG. 3, a pipe mounting curved surface having a curved structure into which a part of the outer surface of the pipe P is inserted is formed on a lower side of the housing unit 60, and a bead passing groove 61 is provided at a position, corresponding to the bead B, of a contact surface with the pipe P to form a structure to prevent interference with the bead.

When the inspection device is mounted on the pipe P, a part of an outer peripheral surface of the pipe P is inserted so that the weld bead B falls within an imaging range of the image sensor unit 10, and when the device is pivoted, the inspection device travels along the weld bead B with the weld bead B inserted into the bead passing groove 62. The housing unit 60 is not limited to any one configuration or structure presented in the above embodiment, and for example, a grip portion is preferably provided so that the device can be smoothly handled in the process of mounting or inspecting the device, and the grip portion may be formed of a finger insertion type grip handle and/or a friction surface grip portion.

In the weld bead inspection device 100 according to the embodiment of the present invention, the image sensor unit 10 means a general sensor that is provided on any one side of the housing unit 50 so as to be capable of smoothly imaging the weld bead B and that is capable of imaging the external shape of the weld bead B, and executes a function of measuring the bead in the form of a black and white or color image and transmitting the relevant image data to a component such as the control module unit 50. The above embodiment is disposed in a structure for imaging the shape of the weld bead in the tangential direction of the pipe and exemplarily shows a structure for imaging a boundary line of the shape of the weld bead B on the basis of the background member 20. Such tangential imaging may be used, for example, for quality inspection, state inspection, and the like of fusion beads for butt welding of plastic pipes but is not limited thereto.

In addition, the technical idea of the present invention may be implemented in a method of imaging the weld bead B on a vertical upper surface of the weld bead B for the purpose of quality inspection, state inspection, and the like of the weld bead by various welding methods, or can also be embodied by a method of imaging the weld bead B both in the tangential direction and in the normal direction of the outer surface of the pipe.

In the weld bead inspection device 100 according to the embodiment of the present invention, the background member 20 is provided at a position facing the image sensor unit 10 to form a background when the weld bead B is imaged, and is configured to directly or indirectly receive the light generated from the illumination unit 30. The background member 20 is not limited to any one configuration or structure presented in the above embodiment. For example, the background member 20 may be configured by mounting a plate member of a predetermined color or attaching colored paper, or at least a part of the illumination unit 30 may be provided on a back surface of the background unit 20 to output light of a predetermined color in the form of a backlight.

The background member 20 may have a control structure that changes the type of color or adjust the light intensity in consideration of the color of the pipe or the internal illuminance of the imaging space in order to improve the imaging quality of the weld bead B. As such a change or adjustment structure, for example, a method of controlling the chromaticity and luminance of the illumination unit 30, changing the RGB mixing ratio of the backlight, or attaching and detaching a plate member by changing the plate member may be adopted.

In the weld bead inspection device 100 according to the embodiment of the present invention, the illumination unit 30 is configured to directly or indirectly provide light to the background member 20 or the weld bead B, and provides active illumination for imaging the external shape of the weld bead B. The illumination unit 30 may be configured to include at least one of white, red, blue, and green light sources to output a single visible light or to output a combination light thereof. That is, for example, in the case of a plastic pipe P, unlike a steel pipe, the plastic pipe P is manufactured in various colors, and when the pipe and the output light of the illumination unit 30 have the same or similar color, the weld bead shape of the pipe P may not be properly imaged. Therefore, the inspection accuracy or the like can be further improved by including a plurality of light sources capable of emitting a plurality of color lights in the illumination unit 30 or the background member 20 and configuring the illumination unit 30 or the background member 20 such that the color of the illumination unit 30 or the background member 20 can be selected and provided in consideration of the color of the pipe P when the weld bead is inspected.

In addition, the illuminance of the illumination unit 30 or the background member 20 may be selected in consideration of the sensitivity of the image sensor unit 10, and it is preferable to secure sufficient illuminance so that the influence of ambient light unintentionally entering from the outside of the housing 60 can be reduced.

In the weld bead inspection device 100 according to the embodiment of the present invention, the contact member 40 is slidably disposed on the outer surface of the pipe P to perform a function of a basic action surface that can stably mount the weld bead inspection device around the weld bead and make the device travel on the pipe, and a groove 41 as shown in FIG. 3 is provided in a portion, matching the weld bead, of a boundary portion of the contact member 40 to form a structure that prevents interference with the weld bead. Here, the contact member 40 may be formed integrally with the housing unit 60 or may be separately formed and assembled.

In the weld bead inspection device 100 according to the embodiment of the present invention, the control module unit 50 is configured to control the device as a whole, for example, control the color of the light source of the illumination unit 30, or the like, and may further include a storage device such as a memory that stores information such as the shape of the weld bead imaged while traveling along the outer surface of the pipe or may further include a communication means for transmitting the information to a peripheral station, a remote server, or the like.

The control module unit 50 further includes an acceleration sensor that detects the movement of the inspection device and/or a gyro sensor that detects a spatial rotation angle of the inspection device, and can be used to determine the traveling speed, position, state, and the like of the inspection device traveling along the outer surface of the pipe.

The weld bead inspection device 100 according to the embodiment of the present invention may further include a fixing unit 80 that maintains the pipe mounting state of the weld bead inspection device 100 so that the inspection device can be made to travel along the outer peripheral surface of the pipe. That is, by slidably and closely fixing the inspection device to the pipe P by means of the fixing unit 80, an inspector or a user makes the weld bead inspection device 100 stably travel along the outer surface of the pipe P to form a structure capable of imaging the weld bead.

In a case where a facility structure including the pipe P is complicated or a point to be inspected is far from the ground, it is difficult and takes a long time to inspect a plurality of welded portions. However, by rotating the device in the circumferential direction in close contact with the pipe P by means of the fixing unit 80 and inspecting the pipe P, it is possible to quickly and accurately inspect the weld bead B by virtue of a simple inspection operation even when a complex facility structure or multiple points are inspected.

Looking at the detailed structure, one end portion of the fixing unit 80 is fixed to one side portion of the inspection device, and the other end portion surrounds the outer surface of the pipe and is fixed to the other side portion of the inspection device. Accordingly, it is possible to prevent falling damage of the weld bead inspection device during a traveling process, and the user can make the weld bead inspection device of the present invention stably travel along the outer surface of the pipe during an inspection process. Such a mounting structure enables one user to smoothly use the inspection device to easily perform an inspection operation without the help of others in a case where a welded position of a pipe located at a high place is inspected.

The fixing unit 80 is preferably formed of a flexible material, for example, may be formed of a fiber material or an elastic band material. In addition, the detailed structure, material, or the like of the fixing unit 80 is not limited thereto, and, for example, may be formed by a method including an elastic element in some sections or end portions.

The fixing unit 80 has a band fixing member 84 at the other end portion of the fixing unit 80, and the mounting state of the inspection device can be formed by arbitrarily fixing the band fixing member 84 on the other side portion of the inspection device in the process of mounting and setting the inspection device on the pipe P. The band fixing member 84 will be described in detail below.

As shown in FIG. 4, the weld bead inspection device 100 according to the embodiment of the present invention is provided such that the image sensor unit 10, the background member 30, and the illumination unit 30 are disposed around a downwardly open space provided on the middle inner side of the housing unit 60, the downwardly open space forms a light shielding space as a whole together with the surface of the pipe P, and the image sensor unit 10 is used in the light environment by the illumination unit 30 to capture a bead image of the pipe P to acquire an inspection image. In this case, the weld bead inspection device 100 can capture a bead image of the pipe P continuously or periodically or in a required section while maintaining a slidably close contact state on the pipe P by means of the fixing unit 80 and traveling along the outer peripheral surface of the pipe P.

In the weld bead inspection device according to the embodiment of the present invention, as shown in FIG. 5, the weld bead inspection device is mounted on the welded portion between the two pipes P and is made to travel along the welded portion of the pipe P in the bead inspection preparation state in which the device is in close contact with the pipe P, which is an object to be inspected, by the fixing unit 80 to image the weld bead B. For example, the operator may rotate the device by her/his hand to proceed with the inspection after the inspection preparation state is completed by winding the device mounted on the pipe P, which is an object to be inspected, with the band member 81 to bring the device into close contact with the pipe P, and it is preferable to use an outline image of the bead B in order to inspect the welded portion and to complete the bead inspection after the bead inspection is performed by making the inspection device rotate and travel over a predetermined outer peripheral surface section or the entire outer peripheral surface section once or twice or more. The weld bead inspection method is not limited to any one, and for example, the weld bead inspection device includes a separate motor structure so that the weld bead inspection device can travel and rotate by oneself and smoothly proceed with the inspection even in a case where the device is far from the ground or it is difficult to turn the device by hand.

Meanwhile, the fixing unit 80 may include an additional configuration or structure to cope with various diameters of the pipe. For example, by further including a plurality of band members 81 formed with individual lengths that match pipes of various diameters, a band member 81 matching a corresponding diameter dimension can be employed and used as necessary.

In addition to this, the fixing unit 80 may further include a length adjusting part 82 that can fix one end portion of the band member 81 and adjust and limit the length of the band member 81. That is, for example, as shown in FIG. 6, in order to prevent the fixing of one end portion of the band member 81 from being loosened, the length adjusting part 82 may be provided to have a structure in which a hinge pivoting portion 82-1 in the form of meshing teeth is provided at one end portion of the band member 81. When the hinge pivoting portion 82-1 is brought into an open state, the band member 81 in the length adjusting part 82 is capable of traveling freely and adjusting the length freely, and when the hinge pivoting portion 82-1 is pivoted in the other direction and is brought into a closed state, the band member 81 is fixed to a predetermined length by the meshing teeth of the hinge rotating part 82-1. The length adjusting part 82 of the fixing unit 80 is not limited to any one configuration or structure presented in the previous embodiment and may be modified and implemented as necessary.

As a modification example of the length adjusting part 82, as shown in FIG. 7, a normal winding buckle structure for fixing one end portion of the band member 81 may be used. The length adjusting part 82 may be directly fixed to one side surface of the housing unit 60 or may be coupled and fixed to one side portion of the housing unit 60 by a coupling link body 82-2. The coupling link body 82-2 may be formed in a simple bar shape or the like.

In addition, as another modification example of the length adjusting part 82, the length adjusting part 82 is configured as in the previously described embodiment, but as shown in FIG. 7, the coupling link body 82-2 may be formed in the form of a spring. In this case, since elastic deformation of the coupling link body 82-2 can be used in the mounting and fixing process of the welding bead inspection device, the band member 81 is formed by selecting leather or inelastic fiber material like a bag strap.

The band member 81 of the fixing unit 80 is fixed to one side surface of the housing unit 60 by the length adjusting part 82, surrounds the pipe P after the length thereof is set, extends to the other side surface of the housing unit 60, and is fixed to the other side surface of the housing unit 60 by the band fixing member 84 to form a mounting and fixing state of the weld bead inspection device. In this way, in order to prevent the band member 81 from interfering with the weld bead in a section surrounding the pipe P, as shown in (a) of FIG. 8, the band member 81 may include a bead passing groove 83 in the longitudinal direction in the middle of the band member 81 in a width direction or may include a structure in which spaced grooves are formed in the middle of the band member 81 in the width direction by using a divided band member 81.

In addition, as shown in FIG. 9, the fixing unit 80 may be configured to include various types of band fixing members 84 that fix a band to the other surface of the housing unit 60. That is, for example, the band fixing member 84 may have a Velcro structure 84-1 so that the band member 81 is not loosened during the inspection of the weld bead B as shown in (a) of FIG. 9, may have a snap button or a tick-tock structure 84-2 as shown in (b) of FIG. 9, may have an insertion-fixed clip-buckle structure 84-3 as shown in (c) of FIG. 9, or may have a hook structure 84-4 as shown in (d) of FIG. 9. The band fixing member 84 of the fixing unit 80 is not limited to any one configuration or structure presented in the previously described embodiment, and each band fixing member 84 forms a mounted and fixed state by fixing the end portion of the band member 81 to the other side portion of the housing unit 60.

In addition, the weld bead inspection device according to the embodiment of the present invention may be configured to include a slip member 85 so as to prevent any contact between the surface of the weld bead or the pipe P and the band member 81 or to assist in sliding traveling when the weld bead inspection device 100 rotates and travels along the outer surface of the pipe P. For example, as shown in (a) of FIG. 10, the slip member 85 may be formed of a hard material such as plastic or metal to form a protrusion structure installed on the band member 81.

In addition to this, the slip member 85 may be provided as a structure including a rolling wheel 86, and as shown in (b) of FIG. 10, the traveling of the inspection device can be made smooth by providing a wheel-type slip member 85 in which an individual element band member 81 is fixed to each of one side and the other side in the longitudinal direction by forming the band member 81 as a structure that couples the band member 81 for each predetermined section and the rolling wheel 86 to each other is pivotably fixed in the middle of the slip member 86.

Alternatively, as shown in (c) of FIG. 10, the traveling of the inspection device is facilitated by including the slip member 85 configured such that a partial cut-out groove to which the rolling wheel 86 can be fixed is formed in the band member 81, a central shaft of the rolling wheel 86 is fixed to both sides of the partial cut-out groove, and the rolling wheel 86 is pivotably provided with respect to the central shaft. In this case, the fixing of the central shaft may employ a method of padding a cloth or the like to the band member 81 and fixing the cloth or the like through sewing or bonding to prevent separation, but is not limited thereto.

This structure can prevent contamination, damage, or the like of the band member 81 and has the effect that rotational traveling of the inspection device can be smoothly performed.

In addition, the band member 81 preferably further includes a scale indicator 89 that indicates the outer diameter dimension of the pipe P to be inspected. That is, as shown in FIG. 11, the scale indicator 89 is provided on a part of the band member 81 so that the weld bead inspection device 100 can be guided to be mounted on the pipe P after the length of the band member 81 is adjusted and set in advance before a mounting operation. The band member 81 longer than necessary compared to the diameter of the pipe P hinders stability when traveling along the outer peripheral surface of the pipe P after mounting, and a shorter band member 81 may make the work of fixing the end portion of the band member 81 after mounting not smooth or may form an unstable fixing state, which may cause inconvenience such as the fixed state being released during traveling. Accordingly, by adjusting and fixing the length of the band member 81 by using the scale indicator 89 provided on the band member 81 so that a mounted and fixed state corresponding to the diameter of the pipe P can be formed, the weld bead can be performed more stably and easily.

As shown in FIG. 12, the weld bead inspection device according to the embodiment of the present invention may be configured to further include light shielding units 70, which reduce or shield the light transmitted from the outside, on both lower sides of the housing unit 60. The light shielding unit 70 is formed as a structure capable of shielding a gap between the housing unit 60 and the pipe P. It is preferable that the housing unit 60 is basically formed with a larger radius of curvature at a lower portion of the housing unit 60 so as to be capable of coping with various outer diameter dimensions of the pipe P and the light shielding unit 70 is further provided at the lower part of the housing unit 60. By virtue of this structure, the measurement position of the bead is relatively and consistently maintained even in various outer diameter dimensions of the pipe P, so that the measurement accuracy or the like can be maintained well. The light shielding unit 70 is not limited to any one configuration or structure presented in the previously described embodiment, and may be formed of, for example, a flexible pleated material, a fiber material, a brush material, or the like.

In addition to this, the description of the present invention described above is for illustrative purpose only, and persons having ordinary knowledge in the art to which the present invention pertains will be able to understand that the present invention can be easily modified into other specific forms without changing the technical spirit or essential features of the present invention. Therefore, it should be understood that the embodiment described above is merely illustrative in all respects and not restrictive. For example, each component described as a single type may be implemented in a distributed or divided form, and similarly, components described in distributed or divided forms may also be implemented in a combined form within the scope understood by persons having ordinary skill in the art. In addition, the steps of the method may be independently implemented multiple times or may be implemented multiple times in combination with at least any other step.

The scope of the present invention is indicated by the following claims, and all changes or modified forms derived from the meaning and scope of the claims and their equivalents should be construed as being included in the scope of the present invention.

EXPLANATION OF REFERENCE NUMERALS

100: WELD BEAD INSPECTION DEVICE
10: IMAGE SENSOR UNIT
20: BACKGROUND MEMBER
30: ILLUMINATION UNIT
40: CONTACT MEMBER
50: CONTROL MODULE UNIT
60: HOUSING UNIT
70: LIGHT SHIELDING UNIT
80: FIXING UNIT
81: BAND MEMBER
82: LENGTH ADJUSTING PART (BUCKLE)
83: BEAD PASSING GROOVE
84: BAND FIXING MEMBER
85: SLIP MEMBER
86: ROLLING WHEEL
89: SCALE INDICATOR
P: PIPE
B: (WELD) BEAD

The invention claimed is:

1. A weld bead inspection device that inspects a shape of a weld bead on an outer surface of a pipe, the weld bead inspection device comprising:
   an image sensor unit that images the shape of the weld bead in a downwardly open inner space formed on a middle inner side of a housing unit;
   an illumination unit that provides illumination light directly or indirectly to the weld bead; and
   a background member at a position facing the image sensor unit,
   wherein the housing unit has a pipe mounting surface formed on a lower side of the housing unit so as to be mounted in close contact with the outer surface of the pipe and be slidable along the outer surface, and
   wherein the illumination unit provides the illumination light to the weld bead in the form of transmitted light transmitted from a back surface of the background member.

2. The weld bead inspection device according to claim 1, wherein depending on a color of the outer surface of the pipe, a surface color of the background member is replaced or a color of the illumination light of the illumination unit is changed.

3. The weld bead inspection device according to claim 1, further comprising:
   a fixing unit that maintains a pipe mounting state of the weld bead inspection device so that the inspection device is allowed to stably travel along an outer peripheral surface of the pipe,
   wherein at least a part of the fixing unit is formed of an elastic material or is formed in a structure including an elastic element.

4. The weld bead inspection device according to claim 3, wherein the fixing unit includes:
   a band member having a length capable of reaching the outer peripheral surface of the pipe while surrounding the outer peripheral surface at least from one side of the housing unit to the other side and formed of a flexible material; and
   a band fixing member that is provided on at least one of one side and the other side of the housing unit and releasably fixed to form a pipe mounting state of the weld bead inspection device.

5. The weld bead inspection device according to claim 4, wherein the fixing unit includes a length adjusting part on any one of one side and the other side of the housing unit to adjust a length of the band member to a length corresponding to an outer diameter dimension of the pipe.

6. A weld bead inspection device according to claim 4, wherein the fixing unit includes a bead passing groove or a slip member in a longitudinal direction of the band member to prevent interference with the weld bead.

7. A weld bead inspection device according to claim 4, wherein the fixing unit includes a bead passing groove or a slip member in a longitudinal direction of the band member to prevent interference with the weld bead.

8. The weld bead inspection device according to claim 1, wherein the pipe mounting surface is a curved pipe mounting surface, the device further comprising;
   light shielding units, which reduce or shield light transmitted from the outside, at both end portions of the curved pipe mounting surface formed on the lower side of the housing unit.

9. A weld bead inspection device that inspects a shape of a weld bead on an outer surface of a pipe, the weld bead inspection device comprising:
   an image sensor unit that images the shape of the weld bead in a downwardly open inner space formed on a middle inner side of a housing unit;
   an illumination unit that provides illumination light directly or indirectly to the weld bead; and
   a background member at a position facing the image sensor unit,
   wherein the housing unit has a pipe mounting surface formed on a lower side of the housing unit so as to be mounted in close contact with the outer surface of the pipe and be slidable along the outer surface,
   wherein the illumination unit provides the illumination light to the weld bead in the form of reflected light reflected from a front surface of the background member, and
   wherein depending on a color of the outer surface of the pipe, a surface color of the background member is replaced or a color of the illumination light of the illumination unit is changed.

10. The weld bead inspection device according to claim 9, further comprising:
    a fixing unit that maintains a pipe mounting state of the weld bead inspection device so that the inspection device is allowed to stably travel along an outer peripheral surface of the pipe,
    wherein at least a part of the fixing unit is formed of an elastic material or is formed in a structure including an elastic element.

11. The weld bead inspection device according to claim 9, wherein the pipe mounting surface is a curved pipe mounting surface, the device further comprising;
    light shielding units, which reduce or shield light transmitted from the outside, at both end portions of the curved pipe mounting surface formed on the lower side of the housing unit.

* * * * *